Figure 1:
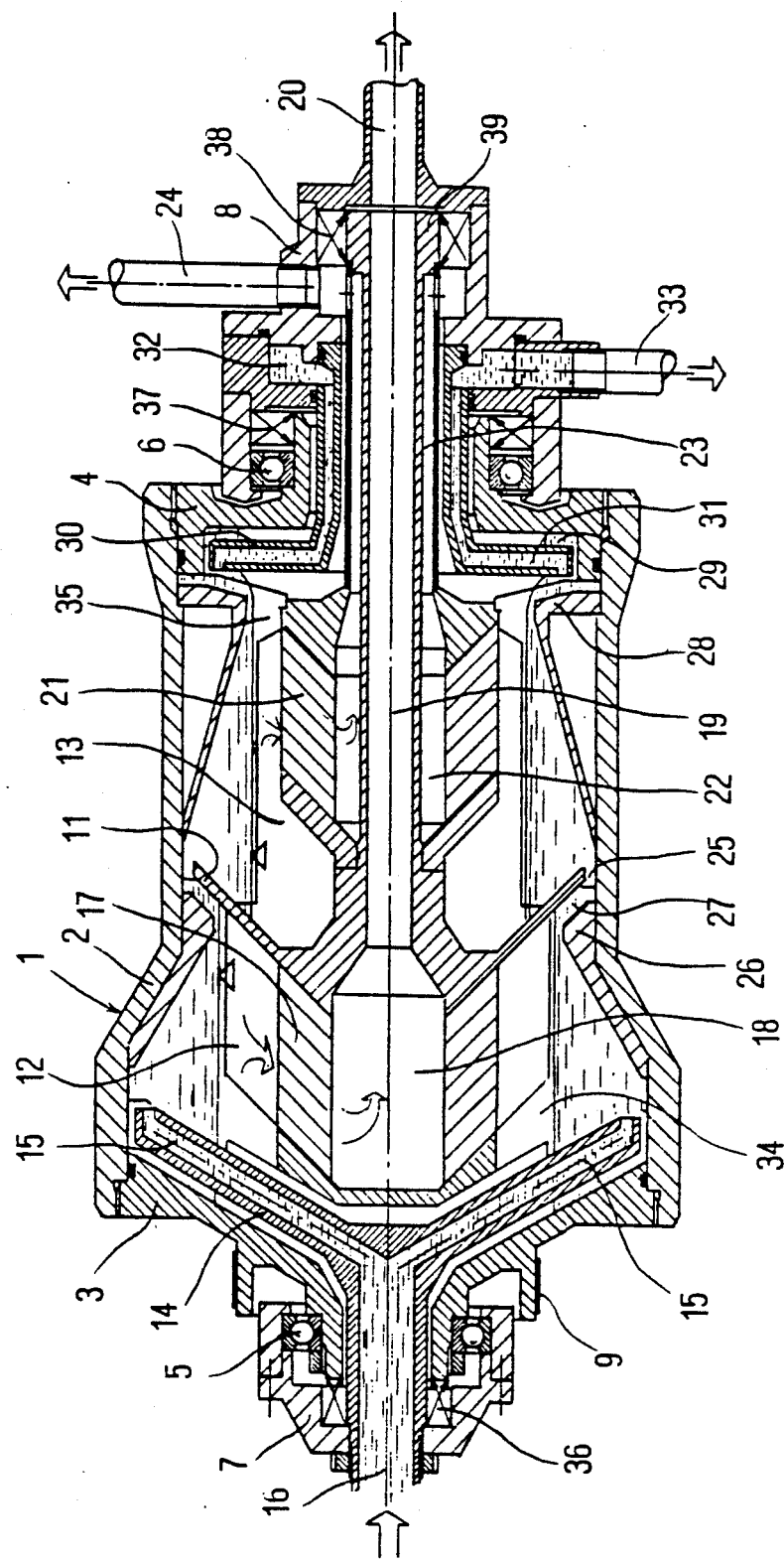

United States Patent [19]

Klintenstedt

[11] Patent Number: 4,978,370
[45] Date of Patent: Dec. 18, 1990

[54] METHOD AND APPARATUS FOR REDUCTION OF THE PRESSURE IN A LIQUID MIXTURE

[75] Inventor: Kjell Klintenstedt, Saltsjö-Boo, Sweden

[73] Assignee: Alfa-Laval Separation AB, Tumba, Sweden

[21] Appl. No.: 339,612

[22] PCT Filed: Nov. 16, 1987

[86] PCT No.: PCT/SE87/00535
§ 371 Date: Mar. 15, 1989
§ 102(e) Date: Mar. 15, 1989

[87] PCT Pub. No.: WO88/03984
PCT Pub. Date: Jun. 2, 1988

[30] Foreign Application Priority Data

Nov. 28, 1986 [SE] Sweden ................. 8605117

[51] Int. Cl.⁵ .................................... B01D 19/00
[52] U.S. Cl. .......................... 55/36; 55/203; 494/56; 494/900
[58] Field of Search ............... 55/203, 36; 494/43, 494/27, 56, 65, 900

[56] References Cited

U.S. PATENT DOCUMENTS 3,752,389 8/1973 Nilsson ..................... 494/27
3,810,347 5/1974 Kartinen .................... 55/203
4,182,480 1/1980 Theyse et al. .............. 55/203
4,702,837 10/1987 Lecoffre et al. ............ 494/85

Primary Examiner—Jay H. Woo
Assistant Examiner—James P. Mackey
Attorney, Agent, or Firm—Davis Hoxie Faithfull & Hapgood

[57] ABSTRACT

In connection with reduction of the pressure of newly produced oil, i.e. a mixture of hydrocarbon compounds, this conventionally is performed stepwise, a momentary pressure drop occurring at each stage.

According to the invention it is suggested that oil is caused to flow radially inward in a chamber (12), which is formed by a rotating vessel (1) and which is only partly filled with rotating oil, whereby the pressure drop in the oil can occur relatively slowly. A free liquid surface is maintained in the chamber (12), and a certain gas pressure is maintained in the liquid free part thereof, while evaporated hydrocarbon compounds are removed through a central gas outlet (18). By means of a special inlet device (14; 3a, 40) it is prevented that the pressure in the oil, when it is on its way through the channel (15; 41) radially outward in the vessel (1) to the level, from which it is to flow radially inward, increases in the way that would happen if the oil would be allowed to flow freely in the channel and simultaneously be completely entrained in the rotation of the vessel.

9 Claims, 3 Drawing Sheets

METHOD AND APPARATUS FOR REDUCTION OF THE PRESSURE IN A LIQUID MIXTURE

The present invention relates to a process for reduction of the pressure in a liquid mixture of hydrocarbon compounds. Such a process is to be found in connection with oil production, when oil flows up of a drill hole with an overpressure which is often very large, for instance in the order of 75-100 bar. The composition of the oil may vary from one oil source to another. For instance the following relatively easily volatile hydrocarbon compounds may be present in the oil: methane, ethane, propane, buthane, isobuthane, penthane, isopentane and hexane.

If the pressure in newly produced oil is reduced momentarily to substantially atmospheric pressure, a large part of the easily volatile hydrocarbon compounds therein will be evaporated. For several reasons this is not desirable. It has proved, however, that the amount of hydrocarbon compounds being evaporated in connection with reduction of the oil pressure may be reduced substantially, if the pressure reduction is performed stepwise. Thus, in practice a method is used in which the pressure reduction is performed in 3-5 steps. Between the pressure reductions, which are performed momentarily in that oil is passed through throttles, the oil is caused to flow through a container in which it exposes a free liquid surface towards a space which contains evaporated hydrocarbon compounds at a thoroughly determined pressure. The evaporated hydrocarbon compounds are removed continuously from the respective containers without the pressures therein being reduced below the predetermined pressures.

It is considered that if the pressure reduction of the oil could be performed in the described manner in even more and smaller steps, even more oil would remain in a liquid form. The additional cost for equipment for reducing the oil pressure in more than 3-5 steps has been considered higher than the profit possible to obtain, however.

The object of the present invention is to provide a new method and an apparatus for reducing the pressure in newly produced oil, i.e. in a liquid mixture of hydrocarbon compounds, enabling that a larger part of the oil can be maintained in a liquid form to acceptable costs.

According to the invention this is possible in a way such, that the liquid mixture is supplied into a chamber, formed by a rotating vessel, at a first radial level in the chamber, the liquid mixture being supplied to the vessel at a predetermined pressure in an area close to the rotational axis of the vessel and being conducted further through a channel radially outward in the vessel to said first radial level in a way such that the pressure of the liquid mixture will not be substantially lower than said pressure, and the pressure of the liquid mixture, when the latter reaches said first radial level, is substantially lower than it would be if the liquid mixture in the channel would be allowed to flow freely therein and simultaneously be completely entrained in the rotation of the vessel; that the liquid mixture being supplied to the chamber is brought into rotation therein by means of the vessel; that a free liquid surface is maintained of the rotating liquid mixture in the chamber at a second level radially inside of said first level; that a gas pressure lower than said predetermined pressure is maintained in the liquid free part of the chamber; that liquid is removed from the chamber at a level radially inside said first level; and that gas is removed from the liquid free part of the chamber.

By this invention it can be avoided that the liquid mixture is subjected to momentary pressure drops. Instead, the pressure in the liquid mixture may be reduced relatively slowly, while a free liquid surface of the liquid mixture is maintained in contact with evaporated hydrocarbon compounds at a desired pressure and at a desired temperature. Within the scope of the invention several chambers of the described kind may be coupled in series, gradually lower gas pressures being maintained in the chambers.

According to the invention the pressure in the liquid mixture should be reduced by bringing the liquid mixture to flow radially inward in a rotating vessel, i.e. by subjecting it to a gradually decreasing centrifugal force. Further, according to the invention, the liquid mixture on its way to the treatment chamber in the vessel should be prevented from being influenced by the rotation of the vessel in the same way as the liquid mixture which is already present within the chamber. In other words it has to be prevented that the pressure in the liquid mixture, when it is on its way radially outward in the vessel, increases in the way that would happen if the liquid mixture would be allowed to flow freely and simultaneously be entirely entrained in the rotation of the vessel. In order to avoid that the liquid mixture is influenced in this way by centrifugal forces on its way into the treatment chamber of the vessel, i.e. before it is introduced into the chamber at said first radial level, the liquid mixture may be supplied in different ways.

According to one example of performing the method according to the invention the liquid mixture may be conducted into the chamber through a channel in a stationary member, which extends centrally into the rotating vessel and further radially outward therein via the liquid free part of the chamber and into the liquid body rotating in the chamber.

According to another example of performing the method according to the invention the liquid mixture may be conducted into the treatment chamber through means rotatable together with the vessel and forming a substantially annular channel extending from an area near the rotational axis of the vessel to said first radial level in the chamber, said channel being substantially free of entrainment members, so that the liquid mixture flowing through the channel during the rotation of the vessel is only insignificantly entrained in the rotation of the vessel.

Figure 2:
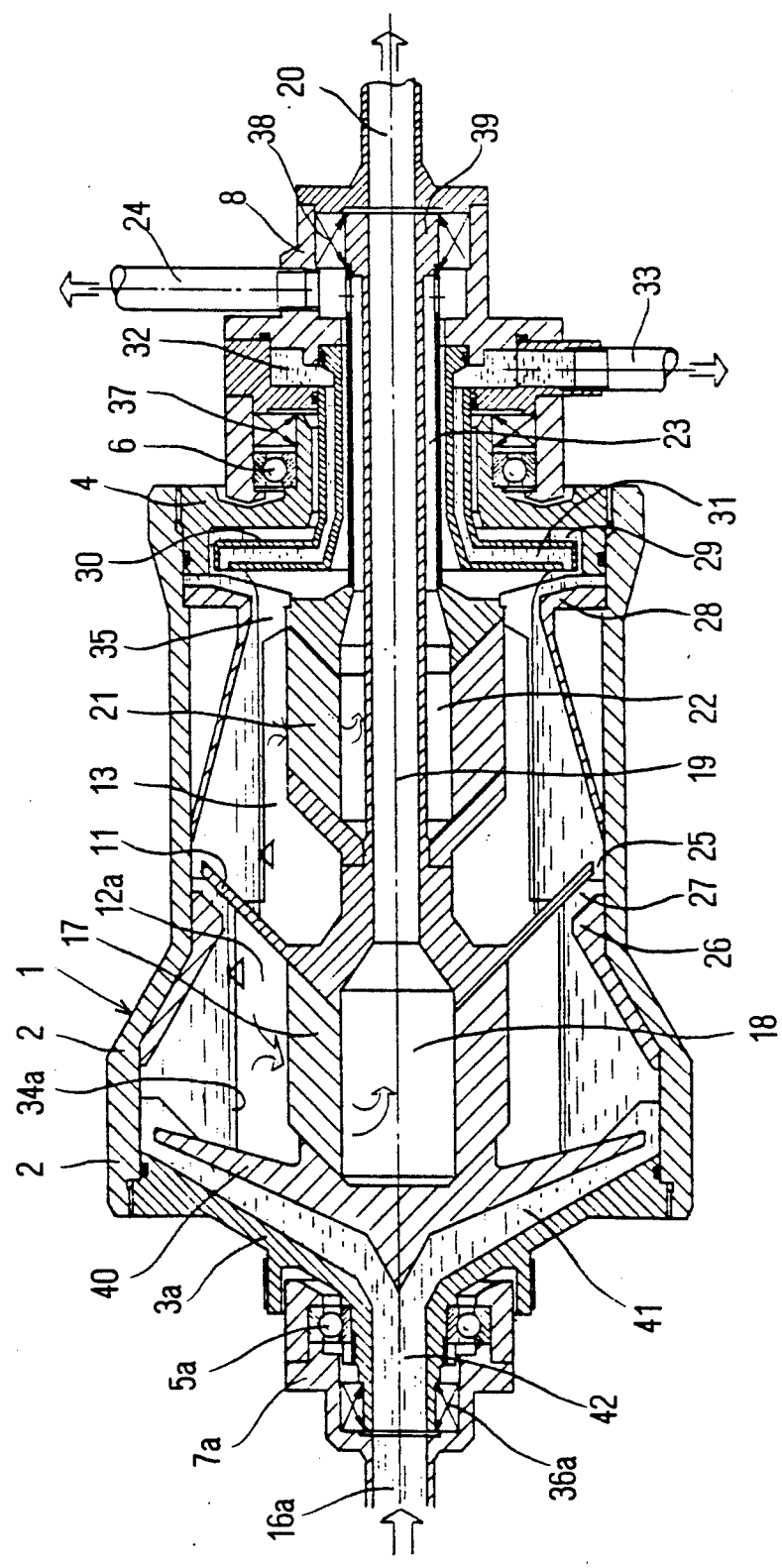
Figure 3:
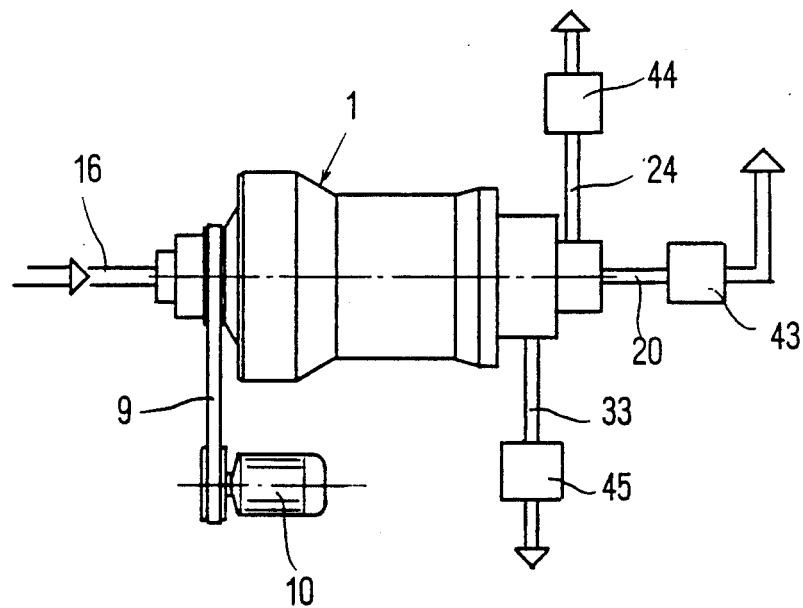

The invention is described more closely in the following with reference to the accompanying drawing, in which FIG. 1 shows a rotatable vessel being a part of an apparatus according to the invention, FIG. 2 shows a modified inlet device in a rotatable vessel according to FIG. 1, and FIG. 3 schematically shows the whole apparatus according to the invention.

In FIG. 1 there is shown a vessel 1 of a rotational symmetrical shape comprising a surrounding wall 2 and two end walls 3 and 4. By means of bearings 5 and 6 the vessel is rotatably supported by two stationary support members 7 and 8. Via a driving device 9 the vessel is rotatably coupled to a driving motor 10 (FIG. 3).

By an annular partition 11 within the vessel 1 the interior thereof is divided in two chambers 12 and 13. In the chamber 12 there is placed an annular stationary inlet member 14, which has several separate inlet channels 15 extending from the rotational axis of the vessel to the vicinity of the surrounding wall 2 of the vessel, where they open into the chamber 12. The inlet member 14 at its centre has a cylindrical part, extending out of the vessel 1 and having a central inlet channel 16, with which all of the channels 15 are communicating.

Within the chamber 12 the vessel 1 supports centrally a stack of conical discs 17 arranged coaxially with the vessel at some axial distance from each other. The discs 17 surround a free space 18, which through the disc interspaces communicates with the chamber 12 and through a first gas outlet channel 19 communicates with a first gas outlet 20 in the stationary supporting member 8.

Within the chamber 13 the vessel 1 supports centrally a further stack of conical discs 21 similar to the discs 17 in the chamber 12. The discs 21 surround a free space 22, which through the disc interspaces communicates with the chamber 13 and through a second gas outlet channel 23 communicates with a second gas outlet 24 in the supporting member 8.

The chambers 12 and 13 communicate with each other via an annular gap 25, which is formed between the surrounding wall 2 of the vessel and the partition 11. The slot 25 is situated at a level in the vessel 1 radially inside of the openings of the inlet channels 15 in the chamber 12.

On its inside in the chamber 12 the surrounding wall 2 supports an annular threshold member 26. The radially innermost portion of this threshold member is situated close to and radially somewhat inside of the connecting slot 25 between the chambers 12 and 13. Between the threshold member 26 and the partition 11 there is formed an annular passage 27.

In the chamber 13 the surrounding wall 2 of the vessel supports a further annular threshold member 28. The radially innermost portion of this threshold member is situated at a level radially inside of the slot 25. Between the threshold member 28 and the end wall 4 of the vessel there is formed an annular groove 29, which is open radially inward. Out into the groove 29 there is extending a stationary annular outlet member 30 arranged coaxially with the vessel 1. The outlet member 30, which is connected with the supporting member 8, has one or more outlet channels 31. These extend from one or more openings in the outlet member 30 at the area of the groove 29 radially inward and further out of the vessel 1 to an outlet chamber 32 in the supporting member 8. An outlet conduit 33 is connected to the supporting member 8.

In the chamber 12 the member supporting the conical discs 17 is supported radially by the surrounding wall 2 of the vessel through several radially and axially extending wings 34, which are evenly distributed around the rotational axis of the vessel. These wings also form entrainment members in the chamber 12, so that the liquid mixture supplied to the chamber is given the rotational movement of the vessel. Similar wings 35 are present in the chamber 13.

For sealing of the chambers 12 and 13 from the surrounding of the vessel there are sealing members 36 between the supporting member 7 and the end wall 3, sealing members 37 between the supporting member 8 and the end wall 4 and sealing members 38 between the supporting member 8 and a central pipe 39 forming the above said gas outlet channel 19 from the chamber 12.

In FIG. 2 there is shown an alternative embodiment of the inlet device of the vessel 1 for liquid mixture. Details in FIG. 2 which have identical counterparts in FIG. 1 have the same reference numerals as in FIG. 1.

Details in FIG. 2, which have counterparts in FIG. 1 but which as to their form are somewhat modified, have the same reference numerals as in FIG. 1 with the addition of letter a.

The inlet device in FIG. 2 comprises a conical partition 40 which through wings 34a is connected with the surrounding wall 2 of the vessel and, thereby, is arranged to rotate with the vessel 1. Between the end wall 3a of the vessel and the partition 40 there is formed an annular channel 41. The channel 41 communicates at the vessel axis with a central channel 42 formed by a cylindrical portion of the end wall 3a and in turn communicating with an inlet channel 16a, which is defined by the supporting member 7a.

In FIG. 3 an apparatus according to the invention is shown schematically. Thus the rotatable vessel 1 is shown with its driving device 9, 10, its inlet channel 16 for liquid mixture, the gas outlets 20 and 24 and the outlet conduit 33 for liquid mixture.

The gas outlet 20 contains a control device 43 of a conventional kind for maintaining of a certain predetermined gas overpressure in the chamber 12 of the vessel. The gas outlet 24 contains a similar control device 44 for maintaining of a predetermined lower gas overpressure in the other chamber 13 of the vessel.

The liquid outlet conduit 33 contains a counter pressure device 45, by means of which a desired counter pressure may be set for the liquid flow out through the outlet member 30.

The apparatus according to the invention operates in the following manner with an inlet device in the vessel 1 of the kind shown in FIG. 1. It is assumed that the vessel 1 is rotating and that the inlet channel 16 is connected to an overpressure source for a liquid mixture of hydrocarbon compounds.

With the pressure it has in the inlet channel 16 the liquid mixture is conducted further through the radial channels 15 and out into the chamber 12 near the surrounding wall 2 of the vessel. In this part of the chamber 12 the liquid mixture is given the same rotational speed as the vessel 1 by means of the wings 34. Between the wings 34 the liquid mixture flows radially inward and axially in the chamber 12, passes over the threshold member 26 and leaves the chamber 12 via the slot 27. When the liquid mixture enters the chamber 13 it flows further on between the wings 35 radially inward and axially towards the outlet member 30. In the chamber 13 the threshold member 28 forms an overflow outlet for the liquid mixture, before it enters the groove 29. Through the channels 31 in the stationary member 30 the liquid mixture leaves the chamber 13. By means of the counter pressure device 45 (FIG. 3) the counter pressure in the outlet concuit 33 is set such that all the liquid mixture flowing over into the groove 29 will be discharged out through the outlet member 30 without causing the free liquid surface in the groove 29 to move radially inside of the threshold member 28.

Hereby, the threshold member 28 will maintain a free liquid surface in the chamber 13 at the same level as its radially innermost portion. The pressure from a liquid column, which will thereby be present within the chamber 13 radially inside of the connecting slot 25 between the chambers 12 and 13, as well as the overpressure from the gas (evaporated hydrocarbons) present in the chamber 13 and acting on the free liquid surfaces therein, will determine the position of the free liquid surface formed in the chamber 12. The counter pressure in the slot 25 from the chamber 12 is constituted by the overpressure of the gas (evaporated hydrocarbons), which is present in the liquid free part of the chamber 12, and the pressure of the liquid column formed in the chamber 12 between the free liquid surfaces therein and the slot 25.

The liquid mixture having been supplied to the vessel 1 via the inlet channel 16 will maintain substantially its pressure while it is flowing through the channels 15 and into the chamber 12. The pressure of the rotating liquid in the chamber 12 near the openings of the channels 15 therein will thus be adjusted such that it substantially corresponds to the pressure of the liquid mixture in the inlet channel 16. If said pressure of the rotating liquid is too high, the liquid mixture can not flow into the chamber 12. If the pressure is too low, a pressure drop may arise in the liquid mixture on its way through the channels 15, resulting in an undesired evaporation of hydrocarbons in these channels.

After the liquid mixture has entered the chamber 12 it flows radially inward and axially towards the passage 27. During this course the liquid mixture is subjected to a gradual pressure drop, part of its content being evaporated and leaving the vessel through the central part of the chamber 12. Possibly entrained liquid drops are separated in the passages between the conical discs 17 and are thrown back to the free liquid surface in the chamber 12.

Still entrained in rotation by the wings 34, which extend even through the passage 27, the liquid mixture flows further on through the passage 27 and the slot 25 into the radially outermost part of the chamber 13. In the slot 27 the pressure is somewhat increasing in the liquid mixture, but in the chamber 13 it is decreasing again, when the liquid mixture flows radially inward and axially toward the outlet member 30. A further part of the liquid mixture is then evaporated in the chamber 13 and is discharged via its liquid free part from the vessel 1.

After its passage of the threshold member 28 the liquid mixture will go on rotating in the groove 29 entrained by the wings 35 which extend into a part of the groove. The pressure in the rotating liquid mixture as well as the gas pressure in the chamber 13 are accomplishing a liquid transport radially inward in the channels 31 of the staionary outlet member 30 and further out through the outlet member 32 and the outlet conduit 33. Possibly the outlet member 30 may be formed as a paring member in the groove 29, so that even the movement of the liquid mixture in the peripheral direction of the groove may be used for the liquid transport through the outlet channels 31.

The inlet device according to FIG. 2 operates in the following manner.

The liquid mixture entering through the channel 16a with a predetermined overpressure flows further on through the annular channel 41 into the chamber 12a. In the channel 41 thin border layers of the liquid mixture will be caused to rotate by the end wall 3a of the vessel and the partition 40, whereas the main part of the liquid will not be given any substantial rotational movement. It is thus possible even by means of this inlet device to maintain substantially the same overpressure in the liquid mixture during its flow from the central inlet channel 16a into the chamber 12a, where the liquid mixture is rotating with the vessel 1.

For accomplishing the best possible flow conditions, when the liquid mixture flows into the chamber 12 or 12a, respectively, different arrangement can be used. For instance, at an inlet device according to FIG. 1 the openings of the inlet channels 16 into the chamber 12 may be turned in the rotational direction of the vessel 1. At an inlet device according to FIG. 2 there can be arranged in the radially outermost part of the channel 41 a number of conical, annular discs—coaxial with the vessel 1 and rotatable therewith—which form between themselves relatively narrow annular passages for the incoming liquid mixture. The function of such discs is that they would successively increase the contact surface between the liquid mixture and rotating surfaces in the vessel for avoiding too heavy chocks at the acceleration of the liquid mixture to full rotational speed at the transfer between the channel 41 and the chamber 12a.

A rotatable vessel has been described above containing two chambers 12 and 13, in which there are maintained different gas pressures at the respective free liquid surfaces. This should be seen as a further developement of a basic embodiment of the invention, in which the vessel contains only one chamber and one single outlet for evaporated hydrocarbon compounds. Since the chambers 12 and 13 communicate through the passage 27 and the slot 25, the chambers may be considered as one and the same chamber, however, concerning the treated liquid. Only concerning the evaporated hydrocarbon compounds the chambers 12 and 13 need be considered as separate.

Within the scope of the invention it is of course possible in this way to divide the interior of the vessel in even more chambers, gradually decreasing gas pressures being maintained therein.

It is also possible according to the invention to connect two or more vessels of the described kind in series. i.e. to connect the liquid outlet 33 of one vessel to the liquid inlet 16 of a subsequent vessel. For instance in this way the pressure in a liquid mixture may be reduced from 60 to 15 bar in a first vessel rotating with a certain speed, and from 15 to 5 bar in a second vessel having the same size but rotating with a lower speed.

A pressure reduction vessel of the kind here described may also be used as a centrifugal separator for separating from the supplied liquid mixture of hydrocarbon compounds for instance water and/or solids. The vessel in a case like that may be equipped with conical separation discs, like conventional centrifugal separators, and with members for continous or intermittent discharge of substances thus separated.

As defined by the accompanying claims it should be prevented according to the invention that the pressure of the liquid mixture, that is flowing radially outward in the vessel through a channel to the treatment chamber inlet at said first radial level, increases in the way which would happen it this liquid would be allowed to flow freely in the channel and simultaneously be completely entrained in the rotation of the vessel.

According to a special embodiment of the invention, which is not shown in the drawing, this is obtainable in the following alternative way.

At an arrangement according to FIG. 2 several frusto-conical discs may be arranged coaxially in the annular channel 41, connected with the vessel 1 for rotation therewith. The distance between these discs may be made so small that the liquid mixture, which is introduced centrally in the disc interspaces, as completely entrained by the discs but is prevented from flowing freely in the interspaces, whereby it will be subjected to a substantial dynamic pressure drop on its way towards the surrounding wall 2 of the vessel. Such a dynamic pressure drop may also be accomplished by members formed in a different way.

I claim:

1. A method for reducing pressure in a liquid mixture of hydrocarbons which comprises supplying the liquid mixture at a predetermined pressure to a rotating vessel at a point near its rotational axis, conducting the mixture radially outwardly through a channel to an inlet of a chamber formed in the vessel, said inlet being situated at a first radial level, the mixture being conducted through said channel in a manner to maintain the mixture at a pressure not substantially lower than said predetermined pressure but substantially lower than it would have been at said first radial level if the mixture had been allowed to flow freely in the channel and been simultaneously entrained in the rotation of the vessel, bringing the liquid mixture in the chamber into rotation with the vessel by means of entrainment members connected with the vessel, maintaining a free liquid surface in said chamber, at a second radial level inwardly of said first level, maintaining a part of said chamber liquid-free radially inwardly of said free liquid surface to receive gas evaporated from said mixture, maintaining a gas pressure lower than said predetermined pressure in the liquid-free part of said chamber, removing liquid from the chamber at a radial level inwardly of said first level, and removing liquid and gas from the vessel, gas being removed from the liquid-free part of the chamber.

2. Method according to claim 1, wherein the liquid mixture is supplied at the first radial level in the chamber by means of a stationary member extending through the liquid-free part of the chamber.

3. Method according to claim 1, wherein the liquid mixture is conducted from an area near the rotational axis of the vessel to the first radial level through an annular channel formed by members rotating with the vessel.

4. Method according to any of the preceding claims, wherein the free liquid surface in the chamber is maintained at said second level by means of an overflow outlet.

5. Apparatus for reducing the pressure in a liquid mixture from a predetermined pressure comprising a rotatable vessel having a chamber, means for rotation of said vessel about an axis, inlet means for supplying a liquid mixture into said chamber at a first radial level and free from means for inducing substantial rotation of said liquid mixture, said inlet means having at least one channel extending from an area near the rotational axis of the vessel to said first radial level and being arranged to prevent a pressure increase in the liquid mixture in the channel such as would result from allowing the liquid mixture to flow freely in the channel and be simultaneously completely entrained in the rotation of the vessel, members connected with the vessel and arranged for entraining liquid mixture in said chamber in the rotation of the vessel, means for maintaining a free liquid surface of the liquid mixture in the chamber at a second level radially inside said first level thereby to provide a liquid-free gas receiving space radially inwardly of said free liquid surface, means for discharging liquid mixture from the chamber at a level radially inside said first level, means for discharging gas from the liquid-free part of the chamber, means for removing gas and liquid from the vessel, gas being removed from said gas receiving space and means for maintaining a gas pressure in the liquid-free part of the chamber which is lower than said predetermined pressure.

6. Apparatus according to claim 5, wherein the inlet means comprises a stationary member which extends axially into the vessel at the rotational axis thereof and radially outward within the vessel to said first level in the chamber.

7. Apparatus according to claim 5, wherein the inlet comprises means rotatable with the vessel and forming a substantially annular channel extending from an area near the rotational axis of the vessel to said first radial level in the chamber, said channel being substantially free of entrainment members, so that liquid mixture flowing through said channel during the rotation of the vessel is only insignificantly entrained in the rotation.

8. Apparatus according to claim 5, and including means forming an overflow outlet from the chamber and constituting both part of the said liquid discharge means and part of said means for maintaining a free liquid surface in the chamber.

9. Apparatus according to claim 5 and wherein said vessel comprises two chambers, one chamber having an inlet for liquid mixture at the first radial level and outlet for liquid mixture at a level radially inside said first level and an outlet for gas from a part of said chamber which is free of liquid during rotation of the vessel, and the other chamber having an inlet for liquid mixture, an outlet for liquid mixture at a level radially inside the level of its said inlet and an outlet for gas from a part of the chamber which is free of liquid during the rotation of the vessel, the outlet for the liquid mixture of said one chamber communicating with the inlet of said other chamber, said apparatus further comprising a first device arranged to maintain a predetermined first overpressure of the gas in the liquid-free part of the first chamber, and a second device arranged to maintain a predetermined second lower overpressure of the gas in the liquid-free part of the other chamber, and means arranged to obtain a free liquid surface at a predetermined level in at least one of the two chambers.

* * * * *